US012688127B2

(12) United States Patent (10) Patent No.: US 12,688,127 B2
Lin et al. (45) Date of Patent: Jul. 21, 2026

(54) CACHE DATA PROCESSING METHOD, SYSTEM, APPARATUS, AND DEVICE, AND COMPUTER STORAGE MEDIUM

(71) Applicant: Suzhou MetaBrain Intelligent Technology Co., Ltd., Suzhou (CN)

(72) Inventors: Kaizhi Lin, Suzhou (CN); Chih Kai Tsai, Suzhou (CN); Po Hsueh Huang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/133,650

(22) PCT Filed: May 17, 2023

(86) PCT No.: PCT/CN2023/094839
§ 371 (c)(1),
(2) Date: May 28, 2025

(87) PCT Pub. No.: WO2024/113694
PCT Pub. Date: Jun. 6, 2024

(65) Prior Publication Data
US 2026/0010488 A1 Jan. 8, 2026

(30) Foreign Application Priority Data

Nov. 30, 2022 (CN) ......................... 202211518389.X

(51) Int. Cl.
*G06F 12/121* (2016.01)

(52) U.S. Cl.
CPC ........ *G06F 12/121* (2013.01); *G06F 2212/45* (2013.01)

(58) Field of Classification Search
None
See application file for complete search history.

(56) References Cited

U.S. PATENT DOCUMENTS 6,480,950 B1* 11/2002 Lyubashevskiy ... G06F 12/1027
711/E12.072
2004/0013112 A1* 1/2004 Goldberg ............ H04L 63/0254
370/235

(Continued)

FOREIGN PATENT DOCUMENTS

CN 107590083 A 1/2018
CN 110908612 A 3/2020

(Continued)

OTHER PUBLICATIONS

Pat Morin. Open Data Structures. 2013. AU Press. pp. 63-66.*

(Continued)

*Primary Examiner* — Nathan Sadler
(74) *Attorney, Agent, or Firm* — Cooper Legal Group, LLC

(57) ABSTRACT

The present application provides a cache data processing method, system, apparatus, and device, and a computer storage medium. The method includes: obtaining access information of cache data; determining, based on the access information and a cache file replacement policy, preceding target data and following target data of the cache data in a cache data linked list, where the cache data linked list is configured for recording data that matches the cache file replacement policy; and generating, based on the preceding target data and the following target data, a target key-value (Continued)

| Value | Value [2N+1:N=1] | Value [N:0] | | Value [2N+1:N=1] | Value [N:0] | | Value [2N+1:N=1] | Value [N:0] | | Value [2N+1:N=1] | Value [N:0] | | Value [2N+1:N=1] | Value [N:0] |
|---|---|---|---|---|---|---|---|---|---|---|---|---|---|---|
| Value | Head chain constant | B | ↔ | A | X | ↔ | B | D | ↔ | X | C | ↔ | D | Tail chain constant |
| Key (ID) | A | | | B | | | X | | | D | | | C | | pair of the cache data, and storing the target key-value pair, to perform cache management on the cache data based on the target key-value pair.

17 Claims, 10 Drawing Sheets

(56)                References Cited

U.S. PATENT DOCUMENTS

| | | | | |
|---|---|---|---|---|
| 2006/0265568 A1* | 11/2006 | Burton | ................ | G06F 12/0862 |
| | | | | 711/216 |
| 2019/0034302 A1* | 1/2019 | Anderson | ............. | G06F 12/123 |

FOREIGN PATENT DOCUMENTS

| | | | | | |
|---|---|---|---|---|---|
| CN | 111400308 A | | 7/2020 | | |
| CN | 111930740 A | | 11/2020 | | |
| CN | 113704261 A | * | 11/2021 | ......... | G06F 16/2237 |
| CN | 115168416 A | | 10/2022 | | |
| CN | 115599711 A | | 1/2023 | | |
| WO | WO-2017137713 A1 | * | 8/2017 | .......... | G06F 21/125 |
| WO | 2022126984 A1 | | 6/2022 | | |

OTHER PUBLICATIONS

Heinz M. Kabutz. "LRU Cache From LinkedHashMap." Feb. 2017. https://www.javaspecialists.eu/archive/Issue246-LRU-Cache-From-LinkedHashMap.html.*

Translation of CN-113704261-A. 2025.*

GeeksforGeeks. "LinkedHashMap in Java." Oct. 2025. https://www.geeksforgeeks.org/java/linkedhashmap-class-in-java/.*

International Search Report of corresponding PCT application (PCT/CN2023/094839) Jul. 9, 2023, 5 pages.

Written Opinion of corresponding PCT application (PCT/CN2023/094839) Jul. 9, 2023, pages.

First Office Action of corresponding CN priority application (CN202211518389.X) Jan. 20, 2023, 8 pages.

Notification to Grant Patent Right for Invention of corresponding CN priority application (CN202211518389.X) Feb. 16, 2023, 3 pages.

Zu Wenqiang et al.,""Configurable and History Information-Aware Replacement Policy for a MultilevelCache"", «Journal of Computer Research and Development» , Dec. 15, 2015, 8 pages, with English abstract.

* cited by examiner

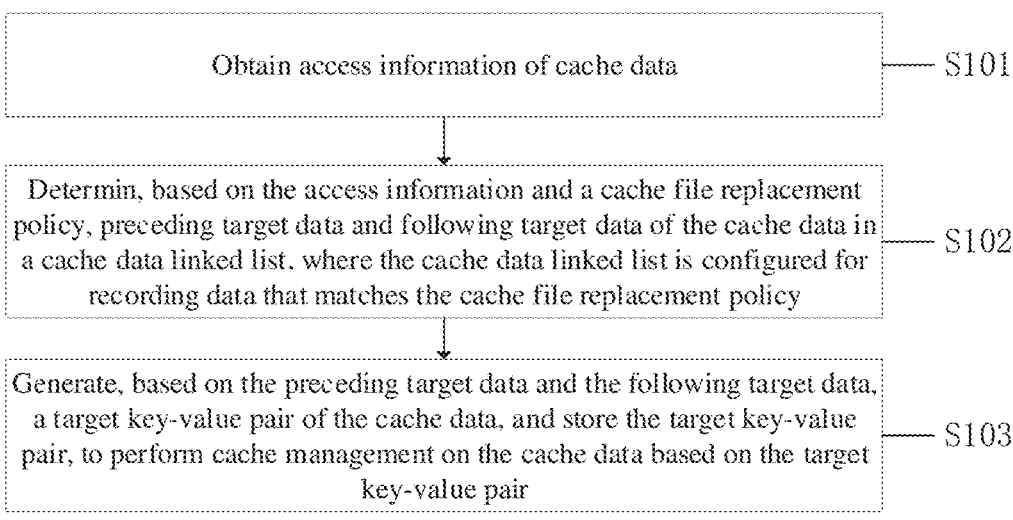

| Obtain access information of cache data | —— S101 |

| Determin, based on the access information and a cache file replacement policy, preceding target data and following target data of the cache data in a cache data linked list, where the cache data linked list is configured for recording data that matches the cache file replacement policy | —— S102 |

| Generate, based on the preceding target data and the following target data, a target key-value pair of the cache data, and store the target key-value pair, to perform cache management on the cache data based on the target key-value pair | —— S103 |

FIG. 1

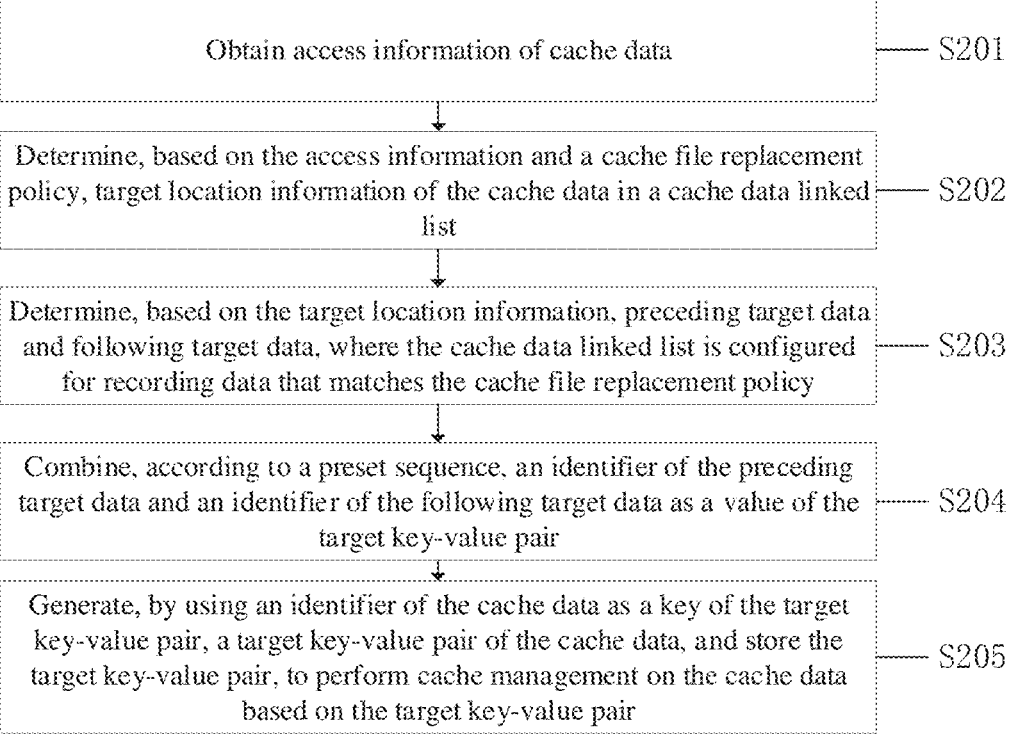

| Obtain access information of cache data | —— S201 |

| Determine, based on the access information and a cache file replacement policy, target location information of the cache data in a cache data linked list | —— S202 |

| Determine, based on the target location information, preceding target data and following target data, where the cache data linked list is configured for recording data that matches the cache file replacement policy | —— S203 |

| Combine, according to a preset sequence, an identifier of the preceding target data and an identifier of the following target data as a value of the target key-value pair | —— S204 |

| Generate, by using an identifier of the cache data as a key of the target key-value pair, a target key-value pair of the cache data, and store the target key-value pair, to perform cache management on the cache data based on the target key-value pair | —— S205 |

FIG. 2

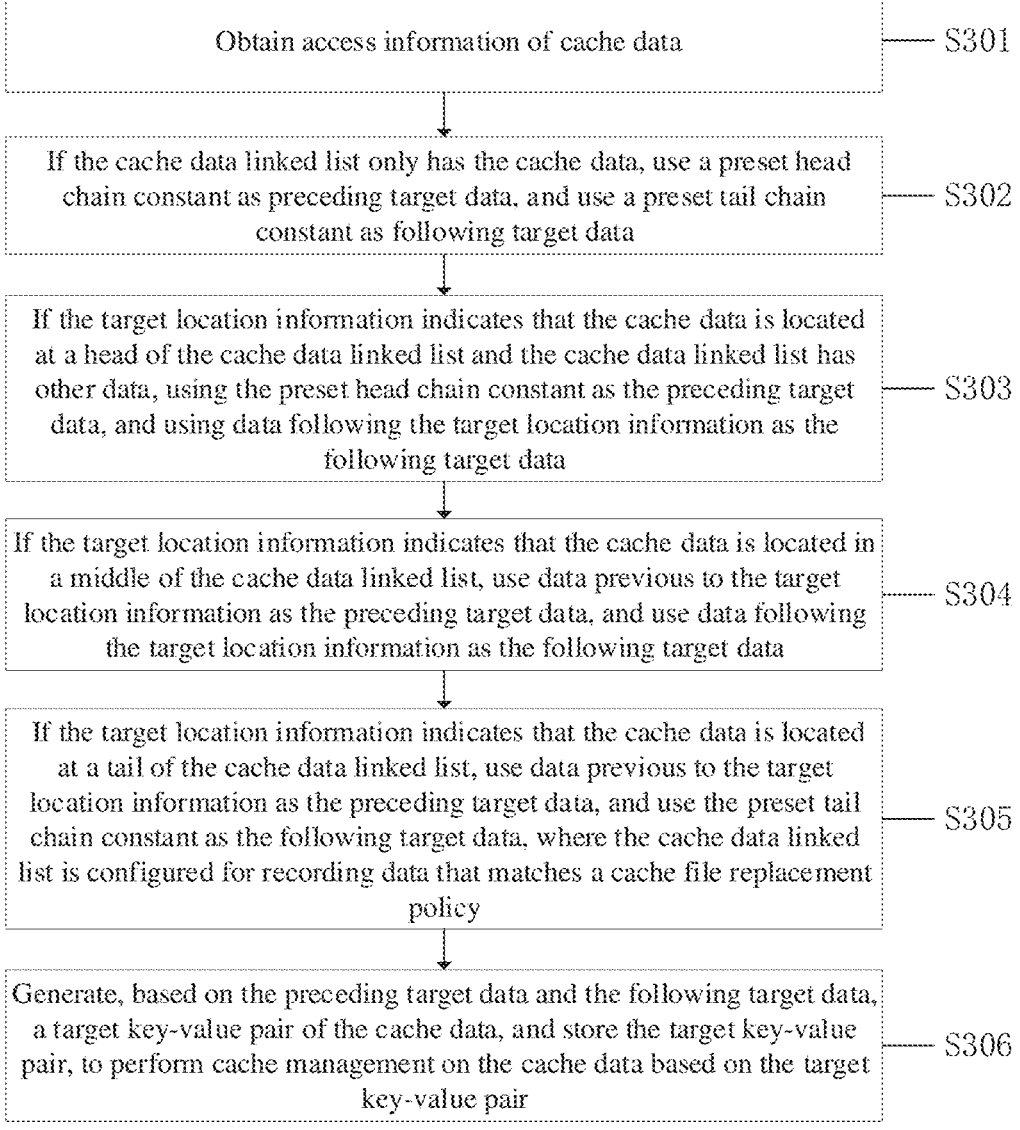

Obtain access information of cache data —— S301

If the cache data linked list only has the cache data, use a preset head chain constant as preceding target data, and use a preset tail chain constant as following target data —— S302

If the target location information indicates that the cache data is located at a head of the cache data linked list and the cache data linked list has other data, using the preset head chain constant as the preceding target data, and using data following the target location information as the following target data —— S303

If the target location information indicates that the cache data is located in a middle of the cache data linked list, use data previous to the target location information as the preceding target data, and use data following the target location information as the following target data —— S304

If the target location information indicates that the cache data is located at a tail of the cache data linked list, use data previous to the target location information as the preceding target data, and use the preset tail chain constant as the following target data, where the cache data linked list is configured for recording data that matches a cache file replacement policy —— S305

Generate, based on the preceding target data and the following target data, a target key-value pair of the cache data, and store the target key-value pair, to perform cache management on the cache data based on the target key-value pair —— S306

FIG. 5

| Key<br>Cache ID of N+1 bit | Value<br>Linked list value of cache ID of 2N+2 bit | |
|---|---|---|
| 0001 (1) | 1000;  1001 | Head chain register:  0001 |
|  |  | Tail chain register:  0001 |
|  |  | |

| Key<br>Cache ID of N+1 bit | Value<br>Linked list value of cache ID of 2N+2 bit | |
|---|---|---|
| 0001 (1) | 0010;  1001 | Head chain register:  0010 |
| 0010 (2) | 1000;  0001 | Tail chain register:  0001 |
|  |  | |

| Key<br>Cache ID of N+1 bit | Value<br>Linked list value of cache ID of 2N+2 bit | |
|---|---|---|
| 0001 (1) | 1000;  0010 | Head chain register:  0001 |
| 0010 (2) | 0001;  1001 | Tail chain register:  0010 |
|  |  | |

| Key<br>Cache ID of N+1 bit | Value<br>Linked list value of cache ID of 2N+2 bit | |
|---|---|---|
| 0001 (1) | 0011;  0010 | Head chain register:  0011 |
| 0010 (2) | 0001;  1001 | Tail chain register:  0010 |
| 0011 (3) | 1000;  0001 | |

| Key<br>Cache ID of N+1 bit | Value<br>Linked list value of cache ID of 2N+2 bit | |
|---|---|---|
| 0001 (1) | 0011;  1001 | Head chain register:  0100 |
| 0100 (4) | 1000;  0011 | Tail chain register:  0001 |
| 0011 (3) | 0100;  0001 | |

| Key<br>Cache ID of N+1 bit | Value<br>Linked list value of cache ID of 2N+2 bit | |
|---|---|---|
| 0001 (1) | 0100;  1001 | Head chain register:  0011 |
| 0100 (4) | 0011;  0001 | Tail chain register:  0001 |
| 0011 (3) | 1000;  0100 | |

| Key<br>Cache ID of N+1 bit | Value<br>Linked list value of cache ID of 2N+2 bit | |
|---|---|---|
| 0101 (5) | 1000;  0011 | Head chain register:  0101 |
| 0100 (4) | 0011;  1001 | Tail chain register:  0100 |
| 0011 (3) | 0101;  0100 | |

| Key<br>Cache ID of N+1 bit | Value<br>Linked list value of cache ID of 2N+2 bit | |
|---|---|---|
| 0101 (5) | 0100;  0011 | Head chain register:  0100 |
| 0100 (4) | 1000;  0101 | Tail chain register:  0011 |
| 0011 (3) | 0101;  1001 | |

FIG. 10

CACHE DATA PROCESSING METHOD, SYSTEM, APPARATUS, AND DEVICE, AND COMPUTER STORAGE MEDIUM

CROSS-REFERENCE TO RELATED APPLICATION

This application is the national phase application of International Application No. PCT/CN2023/094839, filed May 17, 2023, which claims priority to Chinese Patent Application No. 202211518389.X filed with the China National Intellectual Property Administration on Nov. 30, 2022 and entitled "CACHE DATA PROCESSING METHOD, SYSTEM, APPARATUS, AND DEVICE, AND COMPUTER STORAGE MEDIUM". The contents of International Application No. PCT/CN2023/094839 and Chinese Patent Application 202211518389.X are incorporated herein by reference in their entireties.

FIELD

The present application relates to the field of computer technologies, more particularly, to a cache data processing method, system, apparatus and device, and a computer storage medium.

BACKGROUND

Cache is a technology for improving data reading performance. A working principle of cache is that when a CPU (central processing unit) needs to read data, firstly, the data is searched from a cache of a CPU, and the data is immediately read and sent to the CPU for processing after being found; and if the data is not found, data is read from a memory with relatively low cache rate and is sent to the CPU for processing, and meanwhile, a data block where the data is located is called in the cache, whereby an entire block of data is read from the cache subsequently without calling the memory. However, a size of the cache is limited. When space of the cache is occupied, a policy is required to determine which data needs to be cleared, and this policy is a cache file replacement policy. In this process, to facilitate description and record the cache file replacement policy, the cache file replacement policy may be described and recorded based on a binary tree method. However, the inventor realized that the processing efficiency of this method is relatively low, resulting in relatively low cache data processing efficiency.

SUMMARY

The present application provides a cache data processing system, apparatus, and device, and a non-transitory computer-readable storage medium.

To achieve the above objective, the present application provides the following technical solution:

A cache data processing method includes:

obtaining access information of cache data;

determining, based on the access information and a cache file replacement policy, preceding target data and following target data of the cache data in a cache data linked list, where the cache data linked list is configured for recording data that matches the cache file replacement policy; and generating, based on the preceding target data and the following target data, a target key-value pair of the cache data, and storing the target key-value pair, to perform cache management on the cache data based on the target key-value pair.

In some embodiments, the determining, based on the access information and a cache file replacement policy, preceding target data and following target data of the cache data in a cache data linked list includes:

determining, based on the access information and the cache file replacement policy, target location information of the cache data in the cache data linked list; and determining, based on the target location information, the preceding target data and the following target data.

In some embodiments, the generating, based on the preceding target data and the following target data, a target key-value pair of the cache data includes:

combining, according to a preset sequence, an identifier of the preceding target data and an identifier of the following target data as a value of the target key-value pair; and using an identifier of the cache data as a key of the target key-value pair.

In some embodiments, the combining, according to a preset sequence, an identifier of the preceding target data and an identifier of the following target data as a value of the target key-value pair includes:

combining, according to a sequence that the identifier of the preceding target data is previous to the identifier of the following target data, the identifier of the preceding target data and the identifier of the following target data as the value of the target key-value pair.

In some embodiments, the combining an identifier of the preceding target data and an identifier of the following target data as a value of the target key-value pair includes:

combining the identifier of the preceding target data after 0 extension and the identifier of the following target data after 0 extension as the value of the target key-value pair; and the using an identifier of the cache data as a key of the target key-value pair includes:

using the identifier of the cache data after 0 extension as the key of the target key-value pair, where 0 extension includes adding 0 previous to the identifier.

In some embodiments, the determining, based on the target location information, the preceding target data and the following target data includes:

in response to that the cache data linked list only has the cache data, using a preset head chain constant as the preceding target data, and using a preset tail chain constant as the following target data;

in response to that the target location information indicates that the cache data is located at a head of the cache data linked list and the cache data linked list has other data, using the preset head chain constant as the preceding target data, and using data following the target location information as the following target data;

in response to that the target location information indicates that the cache data is located in a middle of the cache data linked list, using data previous to the target location information as the preceding target data, and using data following the target location information as the following target data; and in response to that the target location information indicates that the cache data is located at a tail of the cache data linked list, using data previous to the target location information as the preceding target data, and using the preset tail chain constant as the following target data.

In some embodiments, the generating, based on the preceding target data and the following target data, a target key-value pair of the cache data, and storing the target key-value pair further includes:

recording first data and last target data in the cache data linked list.

In some embodiments, the recording first data and last target data in the cache data linked list includes:

recording the first data in the cache data linked list in first preset storage space; and recording the last target data in the cache data linked list in second preset storage space.

In some embodiments, the generating, based on the preceding target data and the following target data, a target key-value pair of the cache data, and storing the target key-value pair further includes:

updating an existing key-value pair of existing data in the cache data linked list.

In some embodiments, the updating an existing key-value pair of existing data in the cache data linked list includes:

in response to existence of the existing key-value pair of the cache data, determining preceding raw data and following raw data of the cache data in the cache data linked list based on a value of the existing key-value pair of the cache data, updating the existing key-value pair of the preceding raw data of a non-preset head chain constant, and/or updating the existing key-value pair of the following raw data of a non-preset tail chain constant; updating the existing key-value pair of the preceding target data of the non-head chain constant, and/or updating the existing key-value pair of the following target data of a non-tail chain constant; and/or deleting and removing the existing key-value pair of the existing data in the cache data linked list; and in response to absence of the existing key-value pair of the cache data, updating the existing key-value pair of the preceding target data of the non-head chain constant, and/or updating the existing key-value pair of the following target data of the non-tail chain constant; and/or deleting and removing the existing key-value pair of the existing data in the cache data linked list.

In some embodiments, the generating, based on the preceding target data and the following target data, a target key-value pair of the cache data includes:

in response to that cache data has an existing key-value pair; and updating, based on the preceding target data and/or the following target data, the existing key-value pair to obtain the target key-value pair.

According to another aspect of the present application, a cache data processing apparatus is provided, including a target KVS circuit. The target KVS circuit includes a KVS circuit process control state machine and a first memory control circuit connected to the KVS circuit process control state machine.

The KVS circuit process control state machine is configured for obtaining access information of cache data; determining, based on the access information and a cache file replacement policy, preceding target data and following target data of the cache data in a cache data linked list, where the cache data linked list is configured for recording data that matches the cache file replacement policy; and generating, based on the preceding target data and the following target data, a target key-value pair of the cache data; and the first memory control circuit is configured for storing the target key-value pair, to perform cache management on the cache data based on the target key-value pair.

In some embodiments, the target KVS circuit includes:

a 0 extender connected to the KVS circuit process control state machine, and configured for performing 0 extension on a data identifier; and a reverse 0 extender connected to the KVS circuit process control state machine, and configured for removing 0 from the data identifier as 0 extension.

In some embodiments, the target KVS circuit includes:

a head chain register, configured for recording first data in the cache data linked list; and a tail chain register, configured for recording last target data in the cache data linked list.

In some embodiments, the cache data processing apparatus further includes:

a database KVS circuit connected to the 0 extender and the reverse 0 extender; and a second memory control circuit connected to the database KVS circuit, where the database KVS circuit is configured for performing data management on a database memory through the second memory control circuit.

In some embodiments, the cache data processing apparatus further includes:

a database memory connected to the second memory control circuit; and a cache data linked list record memory connected to the first memory control circuit.

In some embodiments, the cache data processing apparatus further includes:

a network transmission interface connected to the database KVS circuit.

According to another aspect of the present application, a cache data processing system is further provided, including:

a first obtaining module, configured for obtaining access information of cache data;

a first determining module, configured for determining, based on the access information and a cache file replacement policy, preceding target data and following target data of the cache data in a cache data linked list, where the cache data linked list is configured for recording data that matches the cache file replacement policy; and a first generating module, configured for generating, based on the preceding target data and the following target data, a target key-value pair of the cache data, and storing the target key-value pair, to perform cache management on the cache data based on the target key-value pair.

According to another aspect of the present application, a cache data processing device is further provided, including:

one or more memories, configured for storing computer-readable instructions; and one or more processors, configured for implementing steps of any cache data processing method described above when executing computer-readable instructions.

According to another aspect of the present application, a non-transitory computer-readable storage medium is further provided. The non-transitory computer-readable storage medium stores computer-readable instructions. The computer-readable instructions implement steps of any cache data processing method when executed by one or more processors.

BRIEF DESCRIPTION OF THE DRAWINGS

FIG. 1 is a first flowchart of a cache data processing method according to one or more embodiments of the present application;

FIG. 2 is a second flowchart of a cache data processing method according to one or more embodiments of the present application;

FIG. 5 is a third flowchart of a cache data processing method according to one or more embodiments of the present application;

FIG. 10 is a diagram of information about a key-value pair in the present application;

DETAILED DESCRIPTION

Figure 3:
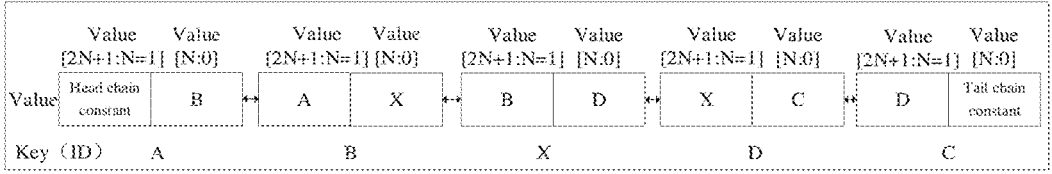
FIG. 3 is a schematic diagram of a target key-value pair.

Technical solutions in embodiments of the present application are clearly and completely described in the following with reference to the drawings in the embodiments of the present application. Apparently, the described embodiments are merely some rather than all of the embodiments of the present application. Based on the embodiments in the present application, all other embodiments obtained by those of ordinary skill in the art without creative work fall within the scope of protection of the present application.

Refer to FIG. 1, which is a first flowchart of a cache data processing method according to the embodiments of the present application.

The cache data processing method according to the embodiments of the present application may include the following steps:

Step S101: Obtaining access information of cache data.

In an actual application, the access information of the cache data may be obtained first, and a type of the cache data, content of the access information, and the like may be determined according to a specific application scenario, for example, the cache data may be picture data, video data, server running data, and the access information may be frequency of access and duration of access.

Step S102: Determining, based on the access information and a cache file replacement policy, preceding target data and following target data of the cache data in a cache data linked list, where the cache data linked list is configured for recording data that matches the cache file replacement policy.

Step S103: Generating, based on the preceding target data and the following target data, a target key-value pair of the cache data, and storing the target key-value pair, to perform cache management on the cache data based on the target key-value pair.

In an actual application, after the access information of the cache data is obtained, the preceding target data and the following target data of the cache data in the cache data linked list need to be determined based on the access information and the cache file replacement policy, so as to facilitate determining storage information of the cache data in the cache data linked list based on the preceding target data and the following target data subsequently. Moreover, after that, a target key-value pair of the cache data needs to be generated based on the preceding target data and the following target data and is stored, to perform cache management on the cache data based on the target key-value pair. It is not difficult to understand that the target key-value pair stores corresponding information of the preceding target data and the following target data, so the preceding target data and the following target data of the cache data in the cache data linked list may be determined by only reading the target key-value pair of the cache data. In this way, preceding target data and following target data of each piece of cache data in the cache data linked list may be determined by only reading all key-value pairs, and then the cache data linked list may be restored by sorting all data according to a sequence, whereby the cache data linked list may be conveniently stored by means of the key-value pairs, and the cache data linked list may be conveniently restored by means of the key-value pairs.

It is to be noted that, a type of the cache file replacement policy in the present application may be determined according to an actual requirement, for example, the cache file replacement policy may be a first in first out algorithm (FIFO), a least frequently used (LFU) algorithm, a least recently used (LRU) algorithm, and an NMRU algorithm. Correspondingly, the cache data linked list is configured for recording the data that matches the cache file replacement policy, and a specific data caching situation may be determined according to the cache file replacement policy.

A cache data processing method according to the present application includes: obtaining access information of cache data; determining, based on the access information and a cache file replacement policy, preceding target data and following target data of the cache data in a cache data linked list, where the cache data linked list is configured for recording data that matches the cache file replacement policy; and generating, based on the preceding target data and the following target data, a target key-value pair of the cache data, and storing the target key-value pair, to perform cache management on the cache data based on the target key-value pair. In the present application, the preceding target data and the following target data of the cache data in the cache data linked list may be determined based on the access information and the cache file replacement policy, and the target key-value pair of the cache data may be generated based on the preceding target data and the following target data and may be stored. In this way, the preceding target data and the following target data of the cache data in the cache data linked list may be quickly known by only reading the target key-value pair, whereby the cache data linked list is quickly stored and restored by means of the key-value pair, thereby facilitating quick processing of the cache data.

Refer to FIG. 2, which is a second flowchart of a cache data processing method according to the embodiments of the present application.

The cache data processing method according to the embodiments of the present application may include the following steps:

Step S201: Obtaining access information of cache data.

Step S202: Determining, based on the access information and a cache file replacement policy, target location information of the cache data in a cache data linked list.

Step S203: Determining, based on the target location information, preceding target data and following target data, where the cache data linked list is configured for recording data that matches the cache file replacement policy.

In an actual application, in a process of determining the preceding target data and the following target data of the cache data in the cache data linked list based on the access information and the cache file replacement policy, the target location information of the cache data in the cache data linked list may be determined based on the access information and the cache file replacement policy. Using the cache file replacement policy being an LRU algorithm as an example, assuming that the cache data is least recently used data, location information of the cache data in the cache data linked list is that the cache data is located at a tail of the cache data linked list and the like; and the preceding target data and the following target data are quickly determined based on the target location information.

Step S204: Combining, according to a preset sequence, an identifier of the preceding target data and an identifier of the following target data as a value of the target key-value pair.

Step S205: Generating, by using an identifier of the cache data as a key of the target key-value pair, a target key-value pair of the cache data, and storing the target key-value pair, to perform cache management on the cache data based on the target key-value pair.

In an actual application, in a process of generating the target key-value pair of the cache data based on the preceding target data and the following target data, the identifier of the preceding target data and the identifier of the following target data may be combined as the value of the target key-value pair according to a preset sequence; and the target key-value pair may be generated by using the identifier of the cache data as a key of the target key-value pair. In a specific application scenario, to distinguish the identifier of the preceding target data and the identifier of the following target data, two storage units may be divided from the value, for example, respectively denoted as Value[2N+1; N+1] and Value[N; 0], and the Value[2N+1; N+1] is configured for storing the identifier of the preceding target data, and the Value[N; 0] is configured for storing the identifier of the following target data, so as to distinguish the identifier of the preceding target data and the identifier of the following target data in the value of the target key-value pair. To facilitate understanding, refer to FIG. 3, key-value pair information of five pieces of data A, B, C, D, and X is as shown in the figure, the preceding target data of the data A is a head chain constant, and the following target data is B, that is, the data A is first data to be out of a link in the cache data linked list. In this case, a sequence of the data stored in the cache data linked list is A-B-X-D-C. Therefore, the cache data linked list may be quickly stored and restored by means of the keys of the present application.

In a specific application scenario, in a process of combining, according to a preset sequence, the identifier of the preceding target data and the identifier of the following target data as the value of the target key-value pair, the identifier of the preceding target data and the identifier of the following target data may be methodically combined as the value of the target key-value pair according to a sequence that the identifier of the preceding target data is previous to the identifier of the following target data.

Figure 4:
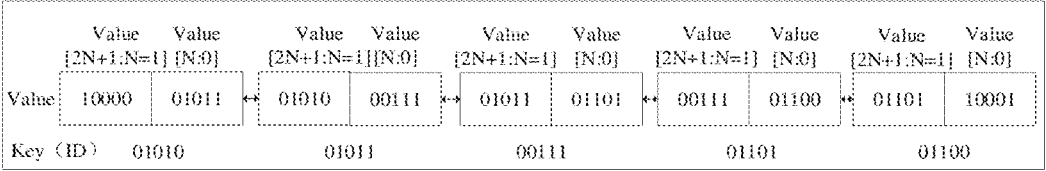
FIG. 4 is a schematic diagram of a target key-value pair after 0 extension.

In a specific application scenario, in a process of combining the identifier of the preceding target data and the identifier of the following target data as the value of the target key-value pair, the identifier of the preceding target data after 0 extension and the identifier of the following target data after 0 extension may be combined as the value of the target key-value pair. Correspondingly, in a process of using the identifier of the cache data as the key of the target key-value pair, the identifier of the cache data after 0 extension may be used as the key of the target key-value pair; and 0 extension includes adding 0 previous to the identifier. By means of secure storage data identifier and data of 0 extension, correspondingly, when corresponding information of the data is restored from the key-value pair, reverse 0 extension needs to be performed on the data identifier and the data in the key-value pair to restore raw data. To facilitate understanding, assuming data is 1000, the data after 0 extension is 01000, and the like. In this case, the schematic diagram of the target key-value pair may be shown in FIG. 4.

Refer to FIG. 5, which is a third flowchart of a cache data processing method according to the embodiments of the present application.

The cache data processing method according to the embodiments of the present application may include the following steps:

Step S301: Obtaining access information of cache data.

Step S302: If the cache data linked list only has the cache data, using a preset head constant as preceding target data, and using a preset tail constant as following target data.

In an actual application, in a process of determining the preceding target data and the following target data based on target location information, if the cache data linked list only has the cache data, the preset head chain constant may be used as the preceding target data, and the preset tail chain constant is used as the following target data.

Step S303: If the target location information indicates that the cache data is located at a head of the cache data linked list and the cache data linked list has other data, using the preset head chain constant as the preceding target data, and using data following the target location information as the following target data.

In an actual application, in a process of determining the preceding target data and the following target data based on the target location information, if the target location information indicates that the cache data is located at a head of the cache data linked list and the cache data linked list has other data, the preset head chain constant may be used as the preceding target data, and the data following the target location information may be used as the following target data.

Step S304: If the target location information indicates that the cache data is located in a middle of the cache data linked list, using data previous to the target location information as the preceding target data, and using data following the target location information as the following target data.

In an actual application, in a process of determining the preceding target data and the following target data based on the target location information, if the target location information indicates that the cache data is located in the middle of the cache data linked list, the data previous to the target location information may be used as the preceding target data, and the data following the target location information may be used as the following target data.

Step S305: If the target location information indicates that the cache data is located at a tail of the cache data linked list, using data previous to the target location information as the preceding target data, and using the preset tail chain constant as the following target data, where the cache data linked list is configured for recording data that matches a cache file replacement policy.

In an actual application, in a process of determining the preceding target data and the following target data based on target location information, if the target location information indicates that the cache data is located at the tail of the cache data linked list, the data previous to the target location information may be used as the preceding target data, and the preset tail chain constant may be used as the following target data.

Step S306: Generating, based on the preceding target data and the following target data, a target key-value pair of the cache data, and storing the target key-value pair, to perform cache management on the cache data based on the target key-value pair.

Figure 6:
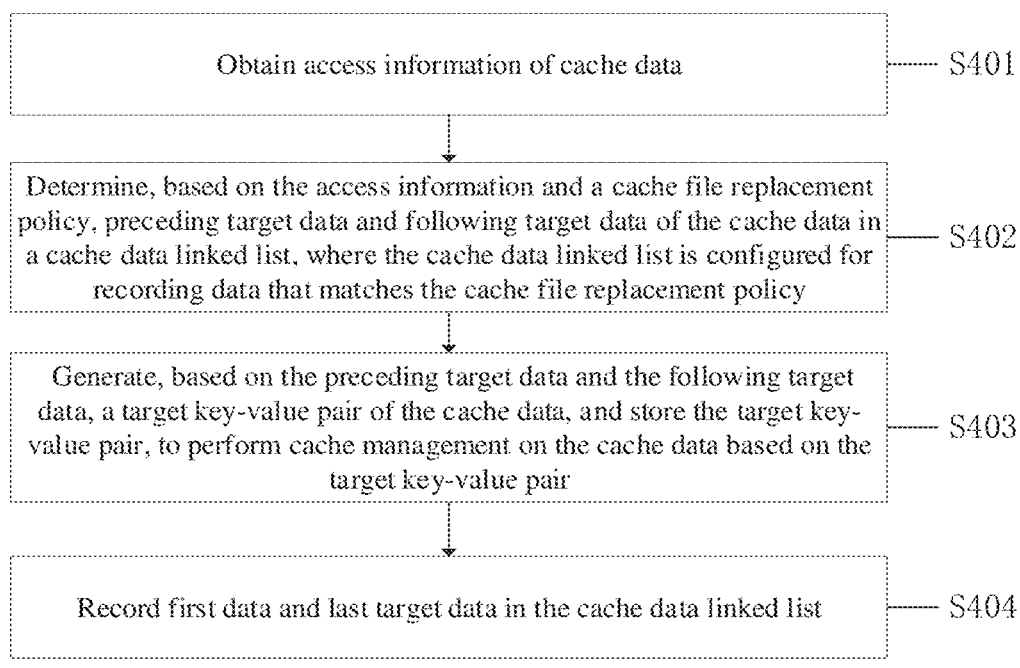
FIG. 6 is a fourth flowchart of a cache data processing method according to one or more embodiments of the present application.

Refer to FIG. 6, which is a fourth flowchart of a cache data processing method according to the embodiments of the present application.

The cache data processing method according to the embodiments of the present application may include the following steps:

Step S401: Obtaining access information of cache data.

Step S402: Determining, based on the access information and a cache file replacement policy, preceding target data and following target data of the cache data in a cache data linked list, where the cache data linked list is configured for recording data that matches the cache file replacement policy.

Step S403: Generating, based on the preceding target data and the following target data, a target key-value pair of the cache data, and storing the target key-value pair, to perform cache management on the cache data based on the target key-value pair.

Step S404: Recording first data and last target data in the cache data linked list.

In an actual application, after the target key-value pair of the cache data is generated based on the preceding target data and the following target data and is stored, to quickly determine head data and tail data of the cache data linked list, the first data and the last target data in the cache data linked list may in some embodiments be recorded. In this way, the cache data linked list may be quickly restored by querying key-value pairs from recorded head data.

Figure 7:
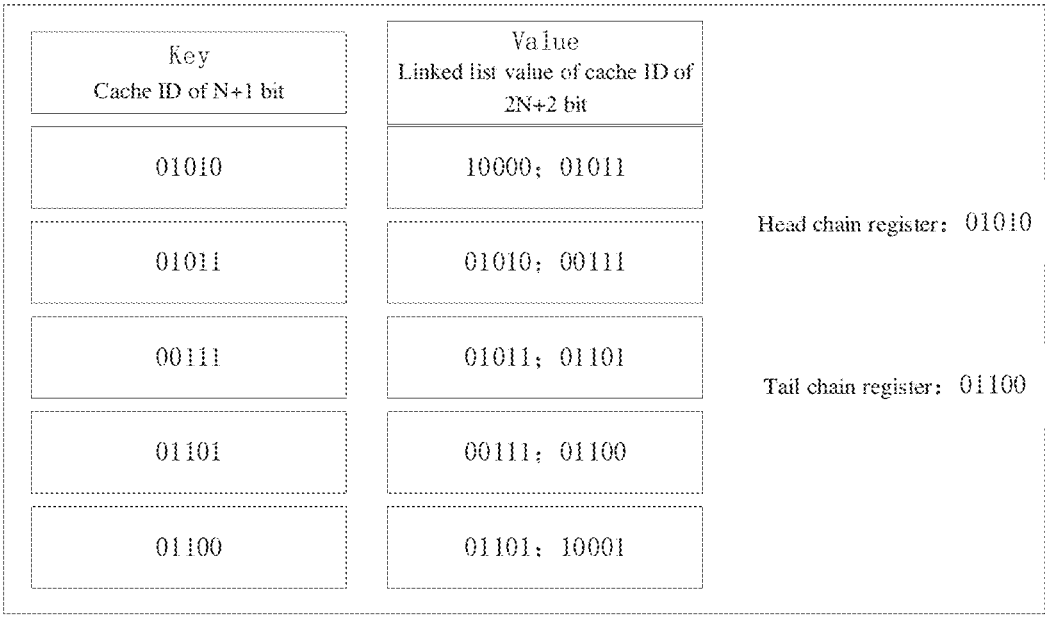
FIG. 7 is a schematic diagram of recording first data and last data in a cache data linked list.

In a specific application scenario, in a process of recording the first data and the last target data in the cache data linked list, the first data in the cache data linked list may be recorded in first preset storage space, for example, a head chain register; the last target data in the cache data linked list may be recorded in second preset storage space, for example, a tail chain register; and the process may be shown in FIG. 7.

Figure 8:
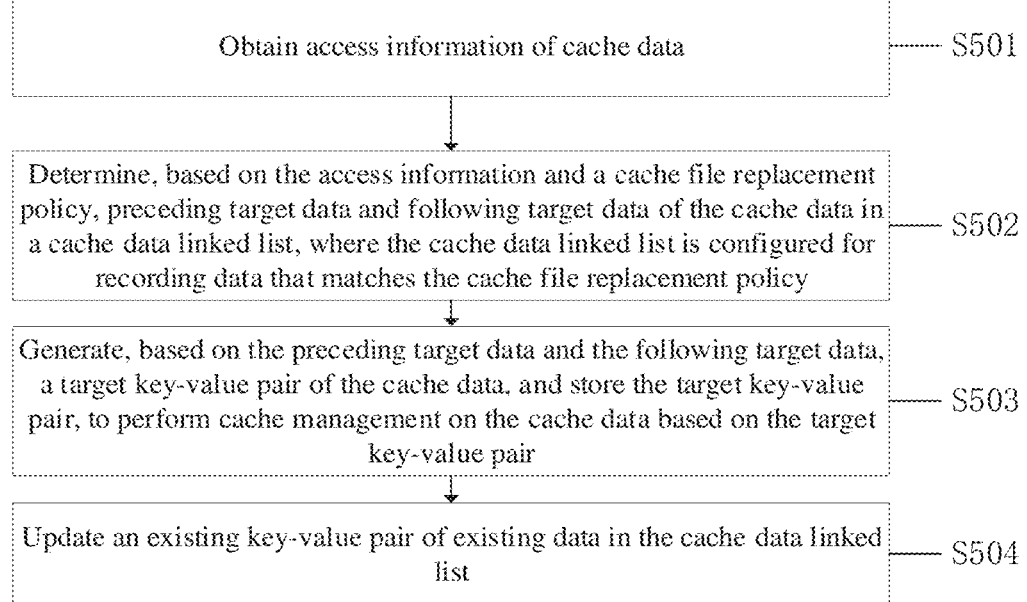
FIG. 8 is a fifth flowchart of a cache data processing method according to one or more embodiments of the present application.

Refer to FIG. 8, which is a fifth flowchart of a cache data processing method according to the embodiments of the present application.

The cache data processing method according to the embodiments of the present application may include the following steps:

Step S501: Obtaining access information of cache data.

Step S502: Determining, based on the access information and a cache file replacement policy, preceding target data and following target data of the cache data in a cache data linked list, where the cache data linked list is configured for recording data that matches the cache file replacement policy.

Step S503: Generating, based on the preceding target data and the following target data, a target key-value pair of the cache data, and storing the target key-value pair, to perform cache management on the cache data based on the target key-value pair.

Step S504: Updating an existing key-value pair of existing data in the cache data linked list.

In an actual application, the existing key-value pair of the existing data whose location has been changed in the cache data linked list may alternatively be updated after the target key-value pair of the cache data is generated based on the preceding target data and the following target data and is stored.

In a specific application scenario, in a process of updating the existing key-value pair of the existing data in the cache data linked list, if the existing key-value pair of the cache data exists, that is, the cache data exists in the cache data linked list, in this case, a location change of the cache data will affect key-value pair information of the target data before changing and after changing, so preceding raw data and following raw data of the cache data in the cache data linked list may be determined based on the value of the existing key-value pair of the cache data, and an existing key-value pair of the preceding raw data of a non-preset head chain constant may be updated, for example, an identifier of the following target data in the existing key-value pair of the preceding raw data may be updated based on an identifier of the following raw data; and/or, an existing key-value pair of the following raw data of a non-preset tail chain constant may be updated, for example, an identifier of the preceding target data in the existing key-value pair of the following raw data may be updated based on an identifier of the preceding raw data; the existing key-value pair of the preceding target data of a non-head chain constant may be updated, for example, an identifier of the following target data in the existing key-value pair of the preceding target data may be updated based on an identifier of the cache data; and/or the existing key-value pair of the following target data of a non-tail chain constant may be updated, for example, the identifier of the preceding target data in the existing key-value pair of the following target data may be updated based on the identifier of the cache data; and/or the existing key-value pair of the existing data in the cache data linked list may be deleted and removed.

If the existing key-value pair of the cache data does not exist, that is, the cache data is not originally in the cache data linked list, the existing key-value pair of the preceding target data of the non-head chain constant may be updated, for example, the identifier of the following target data in the existing key-value pair of the preceding target data may be updated based on the identifier of the cache data; and/or the existing key-value pair of the following target data of the non-tail chain constant may be updated, for example, the identifier of the preceding target data in the existing key-value pair of the following target data of the cache data may be updated; and/or the existing key-value pair of the existing data in the cache data linked list may be deleted and removed.

In a specific application scenario, in a process of generating the target key-value pair of the cache data based on the preceding target data and the following target data, if the cache data exists in the cache data linked list, that is, the cache data has an existing key-value pair, the target key-value pair may be obtained by updating the existing key-value pair based on the preceding target data and/or the following target data.

Figure 9:
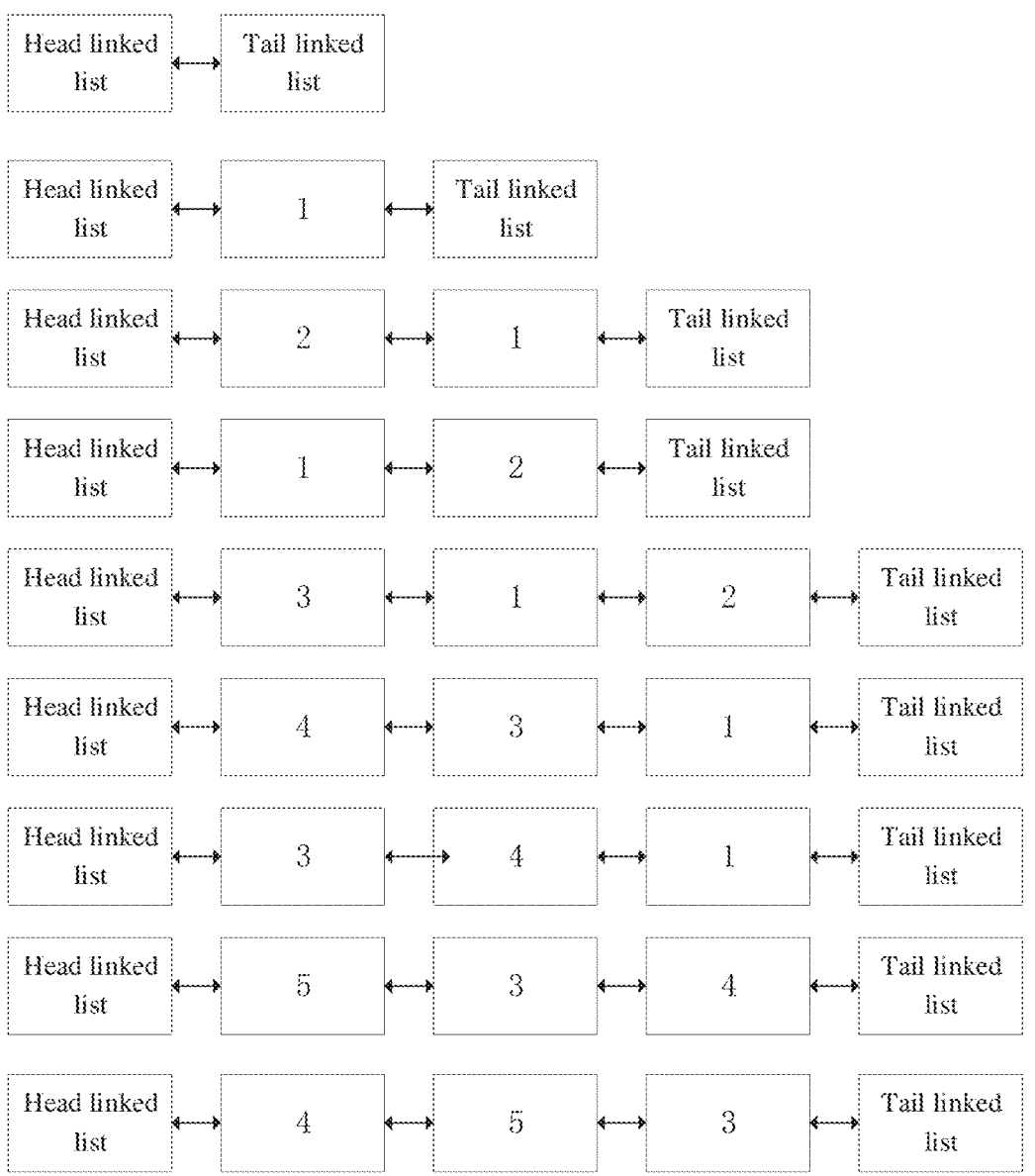
FIG. 9 is a diagram of changes in data storage in the cache data linked list.

To facilitate the cache data processing method according to the present application, now assuming that a data storage change situation in the cache data linked list is shown in FIG. 9 and a cache file replacement policy is an LRU replacement mechanism, the cache data processing method includes the following steps:

initially: a doubly linked list is null, and a head linked list is connected to a tail linked list;

first step: ID 1 is recently used, the ID 1 is added to the head linked list, a left side points to a head, and a right side points to a tail;

second step: ID 2 is recently used, the ID 2 is added to the head linked list, the left side points to the head, and the right side points to the ID 1;

third step: the ID 1 is recently used, the ID 1 is moved to the head linked list, the left points to the head, and the right side points to the ID 2;

fourth step: ID 3 is recently used, the ID 3 is added to the head linked list, the left side points to the head, and the right side points to the ID 1;

fifth step: ID 4 is recently used, the ID 2 is removed from the doubly linked list, the ID 4 is added to the head linked list, the left side points to the head, the right side points to the ID 3, the ID 2 is replaced and removed;

sixth step: the ID 3 is recently used, the ID 3 is moved to the head linked list, the left side points to the head, and the right side points to the ID 4;

seventh step: ID 5 is recently used, the ID 1 is moved out of the doubly linked list, the ID 5 is added to the head linked list, the left side points to the head, the right side points to the ID 5, and the ID 1 is replaced and removed; and eighth step: the ID 4 is recently used, the ID 4 is moved to the head linked list, the left side points to the head, the right side points to the ID 3, and the ID 5 is replaced and removed.

Assuming that storage space (a maximum number of IDs) of a cache data linked list record table is M=3, N=3 bits, a head chain constant=1000, and a tail end constant=1001, a change process of corresponding information of a key-value pair in the present application may be shown in FIG. 10 and the like.

Figure 11:
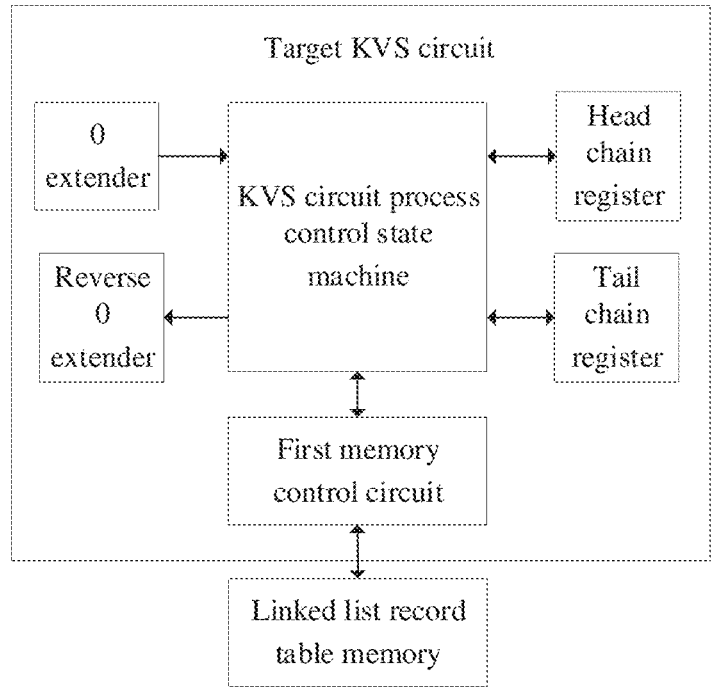
FIG. 11 is a schematic structural diagram of a cache data processing apparatus according to one or more embodiments of the present application.

Refer to FIG. 11, which is a schematic structural diagram of a cache data processing apparatus according to embodiments of the present application.

A cache data processing apparatus according to the embodiments of the present application may include a target KVS (Key Value Search) circuit. The target KVS circuit includes a KVS circuit process control state machine and a first memory control circuit connected to the KVS circuit process control state machine.

The KVS circuit process control state machine is configured for obtaining access information of cache data; determining, based on the access information and a cache file replacement policy, preceding target data and following target data of the cache data in a cache data linked list, where the cache data linked list is configured for recording data that matches the cache file replacement policy; and generating, based on the preceding target data and the following target data, a target key-value pair of the cache data.

The first memory control circuit is configured for storing the target key-value pair, to perform cache management on the cache data based on the target key-value pair.

It is to be noted that, a memory in the data processing apparatus of the present application may use a SRAM (Static Random-Access Memory) or a DRAM (Dynamic Random-Access Memory). It is to be noted that, for each read and write, the SRAM is about 10 times faster than the DRAM, but the DRAM may reach a size of several GB, and is about tens of MB relative to the SRAM. The storage space is expanded by more than a thousand times, so the SRAM or the DRAM may be used according to an actual requirement. In addition, it may be learned from a key-value pair change situation in the present application, no matter in which case, only a few actions of adding/updating/deleting a key of the KVS circuit are required. In a hardware KVS circuit, the foregoing actions may all be completed within fixed time, which may all be represented as 0(1) in an algorithm, that is, constant time. Compared with a software LRU linked list, the LRU replacement circuit of the present application is fast. In addition, compared with other hardware LRU replacement circuits, the cache data processing apparatus not only matches speed (when the SRAM is used), but also increases storage space when the DRAM is used.

In some embodiments, to facilitate understanding, assuming that the cache file replacement policy is an LRU replacement mechanism, the target KVS circuit is an LRU KVS circuit; storage space of a linked list record table of the LRU KVS circuit (a maximum number of IDs) is M, and a bit width of an original ID key is N bits; a bit width of a key of the LRU KVS circuit is set as N+1, and a bit width of a value of the LRU KVS circuit is set as 2(N+1); and setting a head chain constant set as a cache/session ID that might not be used, and setting a tail end constant as a cache/session ID that might not be used, a management process of the key-value pair by the KVS circuit process control state machine may be as follows:

determining whether a quired ID=X(cache or session ID) is read;

if the ID=X(cache or session ID) is read, determining whether a linked list record table of the LRU KVS circuit is null;

if the linked list record table of the LRU KVS circuit is null, adding the ID=X(cache or session) to the LRU KVS: Key=X, Value[2N+1:N+1]=head chain constant, Value[N:0]=tail end constant, a head chain register=X, and a tail chain register=X; returning to a step of determining whether the ID=X(cache or session ID) is read;

if the linked list record table of the LRU KVS is not null, querying whether the linked list record table of the LRU KVS circuit has the ID X;

if the linked list record table of the LRU KVS circuit has the ID X, determining whether the ID X is equal to a content value of the head chain register;

if the ID X is equal to the content value of the head chain register, indicating that X is at a head chain, and returning to perform a step of determining whether the ID=X(cache or session ID) is read;

if the ID X is not equal to the content value of the head chain register, updating a record of Key=X to the head chain, and updating content values of preceding and following records and links, in some embodiments: 1, querying to obtain a Value by using a content value H of the head chain register as a Key, and assuming H_V1=Value[2N+1:N+1], and H_V2=Value[N:0]; 2, querying to obtain a Value by using a content value T of the tail chain register as a Key, and assuming T_V1=Value[2N+1:N+1], and T_V2=Value[N:0]; 3, querying to obtain a Value by using Key=X, and assuming X_V1=Value[2N+1:N+1], and X_V2=Value[N:0]; 4, querying to obtain a Value by using X_V1 in step 3 as a Key, and assuming XV1_V1=Value[2N+1:N+1], XV1_V2=Value[N:0]; 5, querying to obtain a Value by using X_V2 in step 3 as a Key, and assuming XV2_V1=Value[2N+1:N+1], XV2_V2=Value[N:0]; 6, updating content of Key=X: Value[2N+1:N+1]=head chain constant, and Value[N:0]=H; performing 7-1 or 7-2; and 8, updating the head chain register to be X, where 7-1: if the ID X is equal to H_V2 (indicating that the ID X is a second chain connected to a head chain in a linked list):

(7-1-1): updating content of Key=H: Value[2N+1:N+1]=X, and Value[N:0]=X_V2;

(7-1-2): when the X_V2 is equal to the tail end constant (indicating that the ID X is a tail chain), updating the tail chain register to be H;

(7-1-3): when the X_V2 is not equal to the tail end constant (indicating that the ID X is a non-tail chain), updating content of Key=T: Value[2N+1:N+1]=X_V1, and Value[N:0]=T_V2 (with a link node unchanged), where 7-2: if the ID X is not equal to H_V2 (indicating that the ID X is connected after a third chain connected to the head chain in the linked list):

(7-2-1): updating content of Key=H: Value[2N+1:N+1]=X, and Value[N:0]=H_V2;

(7-2-2): when the X_V2 is equal to the tail end constant (indicating that the ID X is a tail chain);

(a) updating content of Key=X_V1: Value[2N+1:N+1]=XV1_V1, and Value[N:0]=tail end constant;

(b) updating the tail chain register to be X_V1;

(7-2-3): when the X_V2 is equal to T (the tail chain register) (indicating that the ID X is a second chain connected to the tail chain), updating content of Key=T: Value[2N+1:N+1]=X_V1, and Value[N:0]=T_V2 (with a link node unchanged);

(7-2-4): when the X_V2 is not equal to T (the tail chain register), and the X_V2 is not equal to the tail end constant (indicating that the ID X is connected after the third chain of the tail chain);

(a) updating content of Key=X_V1: Value[2N+1:N+1]=XV1_V1 (with the link node unchanged), and Value[N:0]=X_V2;

(b) updating content of the Key=X_V2: Value[2N+1:N+1]=XV1, and Value[N:0]=XV2_V2 (with the link node unchanged);

if the ID X does not exist in the linked list record table of the LRU KVS, determining whether a number of IDs stored in the linked list record table of the LRU KVS circuit is equal to M;

if the number of the IDs stored in the linked list record table of the LRU KVS circuit is equal to M, deleting a current tail chain and updating old and new tail chains, and adding the record of the Key=X to the tail chain and updating the old and new head chains;

if the number of the IDs stored in the linked list record table of the LRU KVS circuit is not equal to M, adding the record of the Key=X to the head chain and updating the old and new head chains;

in a process of deleting the current tail chain and updating the new and old tail chains: querying to obtain a Value by using the content value T of the tail chain register as the Key, and assuming T_V1=Value[2N+1:N+1], and T_V2=Value[N:0]; querying to obtain a Value by using Key=T_V1, and assuming TV1_V1=Value[2N+1:N+1], and TV1_V2=Value[N:0]; updating content of Key=T_V1: Value[2N+1:N+1]=TV1_V1 (with the link node unchanged), and Value[N:0]=tail end constant; deleting the record of the Key=T in the KVS circuit; updating T (the tail chain register) to be T_V1; and in a process of adding the record of the Key=X to the head chain and updating the new and old tail chains: querying to obtain a Value by using a content value H of the tail chain register as a Key, and assuming H_V1=Value[2N+1:N+1], and H_V2=Value[N:0]; updating content of Key=H: Value[2N+1:N+1]=X, Value[N:0]=H_V2 (with the link node unchanged); adding the record of the Key=X, Value[2N+1:N+1]=head chain constant, and Value[N:0]=H; and updating H (the head chain register) to be X.

In a cache data processing apparatus according to the embodiments of the present application, the target KVS circuit may include:

a 0 extender connected to the KVS circuit process control state machine, and configured for performing 0 extension on a data identifier; and a reverse 0 extender connected to the KVS circuit process control state machine, and configured for removing 0 from the data identifier as 0 extension.

In a cache data processing apparatus according to the embodiments of the present application, the target KVS circuit may include:

a head chain register, configured for recording first data in a cache data linked list; and a tail chain register, configured for recording last target data in the cache data linked list.

Figure 12:
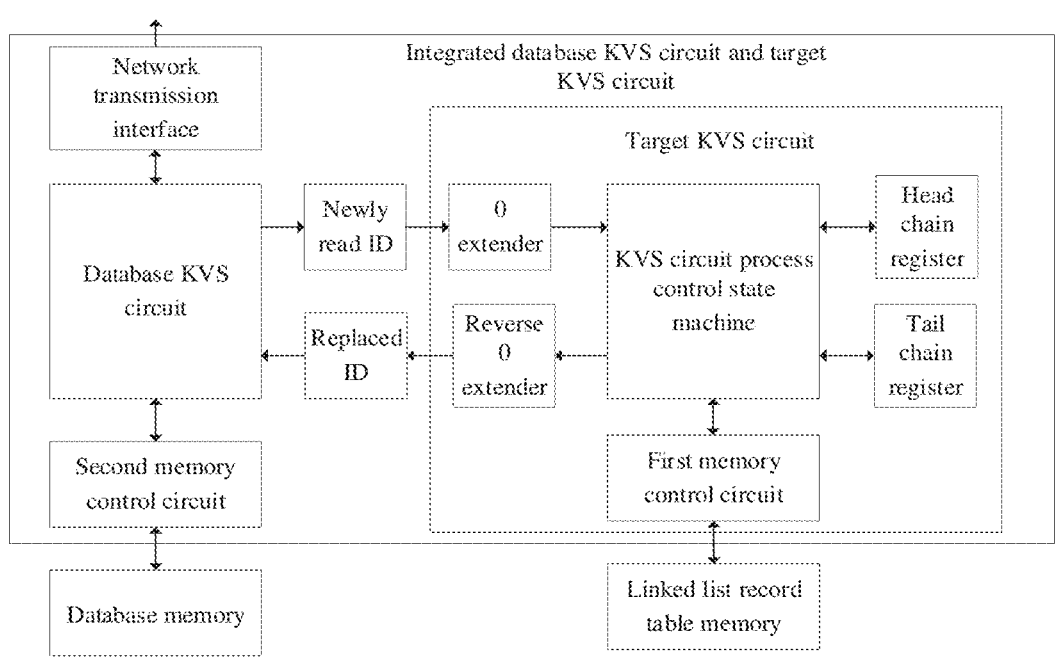
FIG. 12 is another schematic structural diagram of a cache data processing apparatus according to one or more embodiments of the present application.

Referring to FIG. 12, in the cache data processing apparatus according to the embodiments of the present application, the target KVS circuit may extend to a distributed network or a software application layer, that is, may match a hardware acceleration replacement mechanism that is configured for a low-level hardware circuit, for example a CPU (central processing unit)/CACHE (a cache) and the network of the software application layer. Generally, a database of the network or the software application layer will use a software database program, so FIG. 12 shows an advanced using method. A software database is alternatively implemented by using a hardware KVS circuit, and by perfectly matching the target KVS circuit of the present application, a full path may be improved at an access speed of the database implemented by hardware: the database KVS circuit is mainly responsible for reading and writing data in the database. By matching the LRU KVS circuit, when memory space of the database is insufficient, it is determined to delete the least frequently used data (ID) from the database. An advanced solution of the present application applies a specific network interface, so network distributed system hardware acceleration may be supported, that is, the cache data processing apparatus may further include:

a database KVS circuit connected to a 0 extender and a reverse 0 extender;

a second memory control circuit connected to the database KVS circuit, where the database KVS circuit is configured for performing data management on a database memory through the second memory control circuit.

The cache data processing apparatus according to the embodiments of the present application may further include:

a database memory connected to the second memory control circuit; and a cache data linked list record memory connected to the first memory control circuit.

The cache data processing apparatus according to the embodiments of the present application may further include:

a network transmission interface connected to the database KVS circuit, for example, a TCP (Transmission Control Protocol)/a UDP (User Datagram Protocol).

Figure 13:
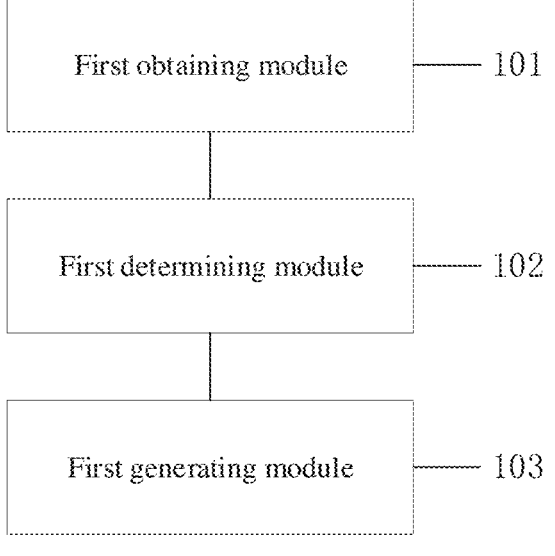
FIG. 13 is a schematic structural diagram of a cache data processing system according to one or more embodiments of the present application.

Refer to FIG. 13, which is a schematic structural diagram of a cache data processing system according to embodiments of the present application.

The cache data processing system according to the embodiments of the present application may include:

a first obtaining module 101, configured for obtaining access information of cache data;

a first determining module 102, configured for determining, based on the access information and a cache file replacement policy, preceding target data and following target data of the cache data in a cache data linked list, where the cache data linked list is configured for recording data that matches the cache file replacement policy; and a first generating module 103, configured for generating, based on the preceding target data and the following target data, a target key-value pair of the cache data, and storing the target key-value pair, to perform cache management on the cache data based on the target key-value pair.

In the cache data processing system according to the embodiments of the present application, the first determining module may include:

a first determining unit, configured for determining, based on the access information and the cache file replacement policy, target location information of the cache data in the cache data linked list; and a second determining unit, configured for determining, based on the target location information, the preceding target data and the following target data.

In the cache data processing system according to the embodiments of the present application, the first generating module may include:

a first generating unit, configured for combining, according to a preset sequence, an identifier of the preceding target data and an identifier of the following target data as a value of the target key-value pair; and a second generating unit, configured for using an identifier of the cache data as a key of the target key-value pair.

In the cache data processing system according to the embodiments of the present application, the first generating unit may be in some embodiments configured for: combining, according to a sequence that the identifier of the preceding target data is previous to the identifier of the following target data, the identifier of the preceding target data and the identifier of the following target data as a value of the target key-value pair.

In the cache data processing system according to the embodiments of the present application, the first generating unit may be in some embodiments configured for: combining the identifier of the preceding target data after 0 extension and the identifier of the following target data after 0 extension as the value of the target key-value pair; and the second generating unit may be in some embodiments configured for using the identifier of the cache data after 0 extension as the key of the target key-value pair, where 0 extension includes adding 0 previous to the identifier.

In the cache data processing system according to the embodiments of the present application, the second generating unit may be in some embodiments configured for: if a cache data linked list only has cache data, using a preset head chain constant as preceding target data, and using a preset tail chain constant as the following target data; if target location information indicates that the cache data is located at a head of the cache data linked list and the cache data linked list has other data, using the preset head chain constant as the preceding target data, and using the data following the target location information as the following target data; if the target location information indicates that the cache data is located in a middle of the cache data linked list, using data previous to the target location information as the preceding target data, and using data following the target location information as the following target data; and if the target location information indicates that the cache data is located at a tail of the cache data linked list, using data previous to the target location information as the preceding target data, and using the preset tail chain constant as the following target data.

The cache data processing system according to the embodiments of the present application may further include:

a first recording module, configured for recording first data and last target data in the cache data linked list after the first generating module generates the target key-value pair of the cache data based on the preceding target data and the following target data and stores the target key-value pair.

In the cache data processing system according to the embodiments of the present application, the first recording module may include:

a first recording unit, configured for recording the first data in the cache data linked list in first preset storage space; and a second recording unit, configured for recording the last target data in the cache data linked list in second preset storage space.

The cache data processing system according to the embodiments of the present application may further include:

a first updating module, configured for updating an existing key-value pair of existing data in the cache data linked list after the first generating module generates the target key-value pair of the cache data based on the preceding target data and the following target data and stores the target key-value pair.

In the cache data processing system according to the embodiments of the present application, the first updating module may include:

a first updating unit, configured for: when the existing key-value pair of the cache data exists, determining preceding raw data and following raw data of the cache data in the cache data linked list based on a value of the existing key-value pair of the cache data, updating the existing key-value pair of the preceding raw data of a non-preset head chain constant, and/or updating the existing key-value pair of the following raw data of a non-preset tail chain constant; updating the existing key-value pair of the preceding target data of the non-head chain constant, and/or updating the existing key-value pair of the following target data of the non-tail chain constant; and/or deleting and removing the existing key-value pair of the existing data in the cache data linked list; and the existing key-value pair of the cache data does not exist, updating the existing key-value pair of the preceding target data of the non-head chain constant, and/or updating the existing key-value pair of the following target data of the non-tail chain constant; and/or deleting and removing the existing key-value pair of the existing data in the cache data linked list.

In the cache data processing system according to the embodiments of the present application, the first generating module may include:

a third generating unit, configured for: if cache data has an existing key-value pair, updating, based on preceding target data and/or following target data, the existing key-value pair to obtain a target key-value pair.

Figure 14:
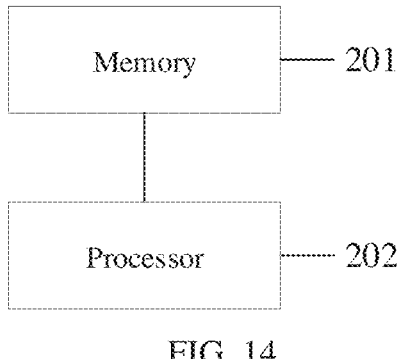
FIG. 14 is a schematic structural diagram of a cache data processing device according to one or more embodiments of the present application.

The present application further provides a cache data processing device and a non-transitory computer-readable storage medium, which both have corresponding effects of a cache data processing method according to the embodiments of the present application. Refer to FIG. 14, which is a schematic structural diagram of a cache data processing device according to the embodiments of the present application.

A cache data processing device according to the embodiments of the present application includes a memory 201 and a processor 202. The memory 201 stores computer-readable instructions. The processor 202 implements the following steps when executing the computer-readable instructions:

obtaining access information of cache data;

determining, based on the access information and a cache file replacement policy, preceding target data and following target data of the cache data in a cache data linked list, where the cache data linked list is configured for recording data that matches the cache file replacement policy; and generating, based on the preceding target data and the following target data, a target key-value pair of the cache data, and storing the target key-value pair, to perform cache management on the cache data based on the target key-value pair.

A cache data processing device according to the embodiments of the present application includes a memory 201 and a processor 202. The memory 201 stores computer-readable instructions. The processor 202 implements the following steps when executing the computer-readable instructions: determining, based on the access information and a cache file replacement policy, target location information of cache data in a cache data linked list; and determining preceding target data and following target data based on the target location information.

A cache data processing device according to the embodiments of the present application includes a memory 201 and a processor 202. The memory 201 stores computer-readable instructions. The processor 202 implements the following steps when executing the computer-readable instructions: combining, according to a preset sequence, an identifier of preceding target data and an identifier of following target data as a value of a target key-value pair; and using an identifier of cache data as a key of the target key-value pair.

A cache data processing device according to the embodiments of the present application includes a memory 201 and a processor 202. The memory 201 stores computer-readable instructions. The processor 202 implements the following steps when executing the computer-readable instructions: combining, according to a sequence that an identifier of preceding target data is previous to an identifier of following target data, the identifier of the preceding target data and the identifier of the following target data as a value of a target key-value pair.

A cache data processing device according to the embodiments of the present application includes a memory 201 and a processor 202. The memory 201 stores computer-readable instructions. The processor 202 implements the following steps when executing the computer-readable instructions: combining an identifier of preceding target data after 0 extension and an identifier of following target data after 0 extension as a value of a target key-value pair; and using an identifier of cache data after 0 extension as a key of the target key-value pair, where the 0 extension includes adding 0 previous to the identifier.

A cache data processing device according to the embodiments of the present application includes a memory 201 and a processor 202. The memory 201 stores computer-readable instructions. The processor 202 implements the following steps when executing the computer-readable instructions: if a cache data linked list only has cache data, using a preset head chain constant as preceding target data, and using a preset tail chain constant as following target data; if target location information indicates that the cache data is located at a head of the cache data linked list and the cache data linked list has other data, using the preset head chain constant as the preceding target data, and using the data following the target location information as the following target data; if the target location information indicates that the cache data is located in a middle of the cache data linked list, using data previous to the target location information as the preceding target data, and using data following the target location information as the following target data; and if the target location information indicates that the cache data is located at a tail of the cache data linked list, using data previous to the target location information as the preceding target data, and using the preset tail chain constant as the following target data.

A cache data processing device according to the embodiments of the present application includes a memory 201 and a processor 202. The memory 201 stores computer-readable instructions. The processor 202 implements the following steps when executing the computer-readable instructions: recording first data and last target data in a cache data linked list after a target key-value pair of cache data is generated based on preceding target data and following target data and the target key-value pair is stored.

A cache data processing device according to the embodiments of the present application includes a memory 201 and a processor 202. The memory 201 stores computer-readable instructions. The processor 202 implements the following steps when executing the computer-readable instructions: recording first data in a cache data linked list in first preset storage space; and recording last target data in the cache data linked list in second preset storage space.

A cache data processing device according to the embodiments of the present application includes a memory 201 and a processor 202. The memory 201 stores computer-readable instructions. The processor 202 implements the following steps when executing the computer-readable instructions: updating an existing key-value pair of existing data in a cache data linked list after a target key-value pair of cache data is generated based on preceding target data and following target data and the target key-value pair is stored.

A cache data processing device according to the embodiments of the present application includes a memory 201 and a processor 202. The memory 201 stores computer-readable instructions. The processor 202 implements the following steps when executing the computer-readable instructions: if an existing key-value pair of the cache data exists, determining preceding raw data and following raw data of a cache data in a cache data linked list based on a value of the existing key-value pair of the cache data, updating the existing key-value pair of the preceding raw data of a non-preset head chain constant, and/or updating the existing key-value pair of the following raw data of a non-preset tail chain constant; updating an existing key-value pair of preceding target data of the non-head chain constant, and/or updating the existing key-value pair of following target data of the non-tail chain constant; and/or deleting and removing the existing key-value pair of the existing data in the cache data linked list; and if the existing key-value pair of the cache data does not exist, updating the existing key-value pair of the preceding target data of the non-head chain constant, and/or updating the existing key-value pair of the following target data of the non-tail chain constant; and/or deleting and removing the existing key-value pair of the existing data in the cache data linked list.

A cache data processing device according to the embodiments of the present application includes a memory 201 and a processor 202. The memory 201 stores computer-readable instructions. The processor 202 implements the following steps when executing the computer-readable instructions: if cache data has an existing key-value pair, updating the existing key-value pair based on preceding target data and/or following target data to obtain a target key-value pair.

Figure 15:
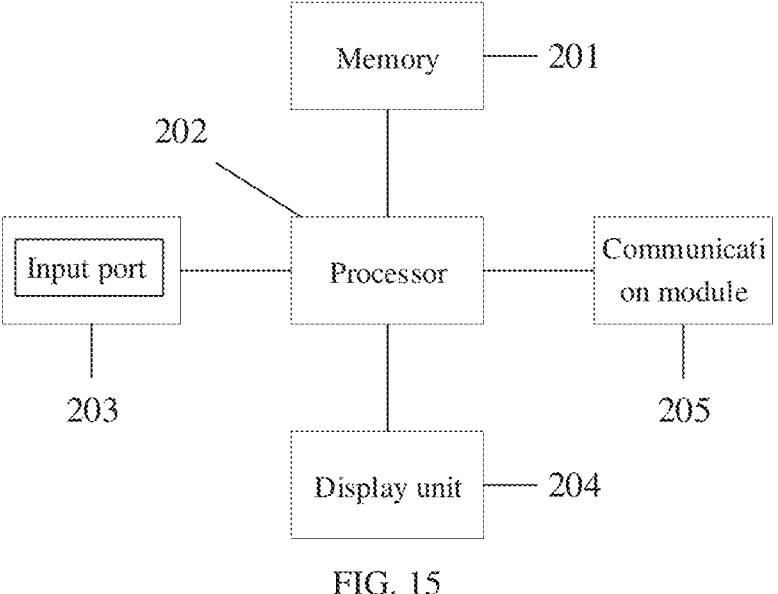
FIG. 15 is another schematic structural diagram of a cache data processing device according to one or more embodiments of the present application.

Referring to FIG. 15, another cache data processing device according to the embodiments of the present application may alternatively include: an input port 203 connected to a processor 202, configured for transmitting an externally input command to the processor 202; a display unit 204 connected to the processor 202, configured for displaying a processing result of the processor 202 to the outside world; and a communication module 205 connected to the processor 202, configured for achieving communication between the cache data processing device and the outside world. The display unit 204 may be a display panel, a laser scanning display, or the like. A communication manner used by the communication module 205 includes, but is not limited to, a Mobile High-Definition Link Technology (HML), a Universal Serial Bus (USB), a High-Definition Multimedia Interface (HDMI), and wireless connection: a Wireless Fidelity (WiFi) Technology, a Bluetooth Communication Technology, a Low-Power Bluetooth Communication Technology, and an IEEE802.11s-based Communication Technology.

The embodiments of the present application provide a non-transitory computer-readable storage medium. The non-transitory computer-readable storage medium stores computer-readable instructions. The computer-readable instructions implement the following steps when executed by a processor:

obtaining access information of cache data;

determining, based on the access information and a cache file replacement policy, preceding target data and following target data of the cache data in a cache data linked list, where the cache data linked list is configured for recording data that matches the cache file replacement policy; and generating, based on the preceding target data and the following target data, a target key-value pair of the cache data, and storing the target key-value pair, to perform cache management on the cache data based on the target key-value pair.

The embodiments of the present application provide a non-transitory computer-readable storage medium. The non-transitory computer-readable storage medium stores computer-readable instructions. The computer-readable instructions implement the following steps when executed by a processor: determining target location information of cache data in a cache data linked list based on access information and cache file replacement policy; and determining preceding target data and following target data based on the target location information.

The embodiments of the present application provide a non-transitory computer-readable storage medium. The non-transitory computer-readable storage medium stores computer-readable instructions. The computer-readable instructions implement the following steps when executed by a processor: combining, according to a preset sequence, an identifier of preceding target data and an identifier of following target data as a value of a target key-value pair; and using an identifier of cache data as a key of the target key-value pair.

The embodiments of the present application provide a non-transitory computer-readable storage medium. The non-transitory computer-readable storage medium stores computer-readable instructions. The computer-readable instructions implement the following steps when executed by a processor: combining, according to a sequence that an identifier of preceding target data is previous to an identifier of following target data, the identifier of the preceding target data and the identifier of the following target data as a value of a target key-value pair.

The embodiments of the present application provide a non-transitory computer-readable storage medium. The non-transitory computer-readable storage medium stores computer-readable instructions. The computer-readable instructions implement the following steps when executed by a processor: combining an identifier of preceding target data after 0 extension and an identifier of following target data after 0 extension as a value of a target key-value pair; and using an identifier of cache data after 0 extension as a key of the target key-value pair, where the 0 extension includes adding 0 previous to the identifier.

The embodiments of the present application provide a non-transitory computer-readable storage medium. The non-transitory computer-readable storage medium stores computer-readable instructions. The computer-readable instructions implement the following steps when executed by a processor: if a cache data linked list only has cache data, using a preset head chain constant as preceding target data, and using a preset tail chain constant as following target data; if target location information indicates that the cache data is located at a head of the cache data linked list and the cache data linked list has other data, using the preset head chain constant as the preceding target data, and using the data following the target location information as the following target data; if the target location information indicates that the cache data is located in a middle of the cache data linked list, using data previous to the target location information as the preceding target data, and using data following the target location information as the following target data;

and if the target location information indicates that the cache data is located at a tail of the cache data linked list, using data previous to the target location information as the preceding target data, and using the preset tail chain constant as the following target data.

The embodiments of the present application provide a non-transitory computer-readable storage medium. The non-transitory computer-readable storage medium stores computer-readable instructions. The computer-readable instructions implement the following steps when executed by a processor: recording first data and last target data in a cache data linked list after a target key-value pair of cache data is generated based on preceding target data and following target data and the target key-value pair is stored.

The embodiments of the present application provide a non-transitory computer-readable storage medium. The non-transitory computer-readable storage medium stores computer-readable instructions. The computer-readable instructions implement the following steps when executed by a processor: recording first data in a cache data linked list in first preset storage space; and recording last target data in the cache data linked list in second preset storage space.

The embodiments of the present application provide a non-transitory computer-readable storage medium. The non-transitory computer-readable storage medium stores computer-readable instructions. The computer-readable instructions implement the following steps when executed by a processor: updating an existing key-value pair of existing data in a cache data linked list after a target key-value pair of cache data is generated based on preceding target data and following target data and the target key-value pair is stored.

The embodiments of the present application provide a non-transitory computer-readable storage medium. The non-transitory computer-readable storage medium stores computer-readable instructions. The computer-readable instructions implement the following steps when executed by a processor: if an existing key-value pair of cache data exists, determining preceding raw data and following raw data of a cache data in a cache data linked list based on a value of the existing key-value pair of the cache data, updating the existing key-value pair of the preceding raw data of a non-preset head chain constant, and/or updating the existing key-value pair of the following raw data of a non-preset tail chain constant; updating an existing key-value pair of preceding target data of the non-head chain constant, and/or updating the existing key-value pair of following target data of the non-tail chain constant; and/or deleting and removing the existing key-value pair of the existing data in the cache data linked list; and if the existing key-value pair of the cache data does not exist, updating the existing key-value pair of the preceding target data of the non-head chain constant, and/or updating the existing key-value pair of the following target data of the non-tail chain constant; and/or deleting and removing the existing key-value pair of the existing data in the cache data linked list.

The embodiments of the present application provide a non-transitory computer-readable storage medium. The non-transitory computer-readable storage medium stores computer-readable instructions. The computer-readable instructions implement the following steps when executed by a processor: if cache data has an existing key-value pair, updating the existing key-value pair based on preceding target data and/or following target data to obtain a target key-value pair.

The non-transitory computer-readable storage medium involved in the present application includes a Random Access Memory (RAM), a Memory, a Read-Only Memory (ROM), an Electrically Programmable ROM, an Electrically Erasable Programmable ROM, a register, a hard disc, a removable disc, a Compact Disc (CD)-ROM.

Descriptions of related parts in the cache data processing system and device and a non-transitory computer-readable storage medium according to the embodiments of the present application refer to detailed descriptions of corresponding parts in the cache data processing method according to the embodiments of the present application. Details are not described herein again. In addition, parts of the above technical solutions according to the embodiments of the present application that have consistent implementation principles with the corresponding technical solutions in the existing technology are not described in detail to avoid excessive repetition.

It is further to be noted that relational terms such as first and second are merely used for distinguishing one entity or operation from another entity or operation herein, and do not necessarily require or imply the existence of any such actual relationship or order between these entities or operations. Moreover, the terms "include", "contain" or any other variations thereof are intended to cover a non-exclusive inclusion, such that a process, method, article or device including a series of elements not only includes those elements, but also includes those elements that are not explicitly listed, or includes elements inherent to such a process, method, article or device. In the absence of more restrictions, elements defined by the phrase "include a/an . . . " do not exclude the existence of additional identical elements in the process, method, commodity, or device that includes the elements.

The above-mentioned description for the disclosed embodiments enables those skilled in the art to implement or use the present application. Various modifications made to these embodiments will be apparent to those skilled in the art, and the general principles defined herein may be implemented in other embodiments without departing from the spirit or scope of the present application. Therefore, the present application will not be limited to these embodiments shown herein, but will conform to the widest scope consistent with the principles and novel features disclosed herein.

What is claimed is:

1. A cache data processing method, comprising:

obtaining access information of cache data;

determining, based on the access information and a cache file replacement policy, preceding target data and following target data of the cache data in a cache data linked list, wherein the cache data linked list is configured for recording data that matches the cache file replacement policy; and generating, based on the preceding target data and the following target data, a target key-value pair of the cache data, and storing the target key-value pair, to perform cache management on the cache data based on the target key-value pair; wherein the determining, based on the access information and a cache file replacement policy, preceding target data and following target data of the cache data in a cache data linked list comprises:

determining, based on the access information and the cache file replacement policy, target location information of the cache data in the cache data linked list; and determining, based on the target location information, the preceding target data and the following target data;

wherein after the generating, based on the preceding target data and the following target data, a target key-value pair of the cache data, and storing the target key-value pair, the method further comprises:

recording first data in the cache data linked list in a head chain register; and recording last target data in the cache data linked list in a tail chain register;

wherein the method further comprises:

in response to an identifier of cache data to be queried not being present in the cache data linked list, determining whether a number of stored identifiers in the cache data linked list equals M, wherein M represents a maximum number of storable identifiers;

in response to the number of stored identifiers in the cache data linked list being equal to M, determining and deleting the last target data in the cache data linked list according to storage content of the tail chain register, updating a target key-value pair of a new last target data after deleting, and updating content of the tail chain register;

in response to the number of stored identifiers in the cache data linked list not being equal to M, determining according to storage content of the head chain register and adding the identifier of the cache data to be queried before the first data in the cache data linked list, updating a target key-value pair corresponding to an old first data and a target key-value pair corresponding to a new first data, and updating the storage content of the head chain register.

2. The method according to claim 1, wherein the generating, based on the preceding target data and the following target data, a target key-value pair of the cache data comprises:

combining, according to a preset sequence, an identifier of the preceding target data and an identifier of the following target data as a value of the target key-value pair; and using an identifier of the cache data as a key of the target key-value pair.

3. The method according to claim 2, wherein the combining, according to a preset sequence, an identifier of the preceding target data and an identifier of the following target data as a value of the target key-value pair comprises:

combining, according to a sequence that the identifier of the preceding target data is previous to the identifier of the following target data, the identifier of the preceding target data and the identifier of the following target data as the value of the target key-value pair.

4. The method according to claim 2, wherein the combining an identifier of the preceding target data and an identifier of the following target data as a value of the target key-value pair comprises:

combining the identifier of the preceding target data after 0 extension and the identifier of the following target data after 0 extension as the value of the target key-value pair; and the using an identifier of the cache data as a key of the target key-value pair comprises:

using the identifier of the cache data after 0 extension as the key of the target key-value pair, wherein the 0 extension comprises adding 0 previous to the identifier.

5. The method according to claim 2, wherein the combining, according to a preset sequence, an identifier of the preceding target data and an identifier of the following target data as a value of the target key-value pair comprises:

dividing two storage units, respectively designated as a first value and a second value;

storing the identifier of the preceding target data into the first value; and storing the identifier of the following target data into the second value.

6. The method according to claim 1, wherein the determining, based on the target location information, the preceding target data and the following target data comprises:

in response to the cache data linked list only having the cache data, using a preset head chain constant as the preceding target data, and using a preset tail chain constant as the following target data;

in response to the target location information indicating that the cache data is located at a head of the cache data linked list and the cache data linked list has other data, using the preset head chain constant as the preceding target data, and using data following the target location information as the following target data;

in response to the target location information indicating that the cache data is located in a middle of the cache data linked list, using data previous to the target location information as the preceding target data, and using the data following the target location information as the following target data; and in response to the target location information indicating that the cache data is located at a tail of the cache data linked list, using the data previous to the target location information as the preceding target data, and using the preset tail chain constant as the following target data.

7. The method according to claim 1, wherein after the generating, based on the preceding target data and the following target data, a target key-value pair of the cache data, and storing the target key-value pair, the method further comprises:

updating an existing key-value pair of existing data in the cache data linked list.

8. The method according to claim 7, wherein the updating an existing key-value pair of existing data in the cache data linked list comprises:

in response to existence of the existing key-value pair of the cache data, determining preceding raw data and following raw data of the cache data in the cache data linked list based on a value of the existing key-value pair of the cache data, and at least one of:

updating the existing key-value pair of the preceding raw data of a non-preset head chain constant, updating the existing key-value pair of the following raw data of a non-preset tail chain constant, updating the existing key-value pair of the preceding target data of the non-preset head chain constant, updating the existing key-value pair of the following target data of the non-preset tail chain constant;

deleting and removing the existing key-value pair of the existing data in the cache data linked list; and in response to absence of the existing key-value pair of the cache data, at least one of:

updating the existing key-value pair of the preceding target data of the non-preset head chain constant, updating the existing key-value pair of the following target data of the non-preset tail chain constant;

deleting and removing the existing key-value pair of the existing data in the cache data linked list.

9. The method according to claim 1, wherein the generating, based on the preceding target data and the following target data, a target key-value pair of the cache data comprises:

in response to the cache data having an existing key-value pair, updating, based on at least one of the preceding target data or the following target data, the existing key-value pair to obtain the target key-value pair.

10. The method according to claim 1, wherein the cache file replacement policy comprises at least one of a first in first out algorithm (FIFO), a least frequently used (LFU) algorithm, a least recently used (LRU) algorithm, or an NMRU algorithm.

11. A non-transitory computer-readable storage medium, wherein the non-transitory computer-readable storage medium stores computer-readable instructions, and the computer-readable instructions implement steps of the cache data processing method according to claim 1.

12. A cache data processing apparatus, comprising a target Key Value Search (KVS) circuit, wherein the target KVS circuit comprises a KVS circuit process control state machine and a first memory control circuit connected to the KVS circuit process control state machine;

the KVS circuit process control state machine is configured for obtaining access information of cache data; determining, based on the access information and a cache file replacement policy, preceding target data and following target data of the cache data in a cache data linked list, wherein the cache data linked list is configured for recording data that matches the cache file replacement policy; and generating, based on the preceding target data and the following target data, a target key-value pair of the cache data; and the first memory control circuit is configured for storing the target key-value pair, to perform cache management on the cache data based on the target key-value pair;

wherein the target KVS circuit comprises:

a head chain register, configured for recording first data in the cache data linked list; and a tail chain register, configured for recording last target data in the cache data linked list;

wherein the KVS circuit process control state machine is further configured for:

in response to an identifier of cache data to be queried not being present in the cache data linked list, determining whether a number of stored identifiers in the cache data linked list equals M, wherein M represents a maximum number of storable identifiers;

in response to the number of stored identifiers in the cache data linked list being equal to M, determining and deleting the last target data in the cache data linked list according to storage content of the tail chain register, updating a target key-value pair of a new last target data after deleting, and updating content of the tail chain register;

in response to the number of stored identifiers in the cache data linked list not being equal to M, determining according to storage content of the head chain register and adding the identifier of the cache data to be queried before the first data in the cache data linked list, updating a target key-value pair corresponding to an old first data and a target key-value pair corresponding to a new first data, and updating the storage content of the head chain register.

13. The cache data processing apparatus according to claim 12, wherein the target KVS circuit comprises:

a 0 extender connected to the KVS circuit process control state machine, and configured for performing 0 extension on a data identifier; and a reverse 0 extender connected to the KVS circuit process control state machine, and configured for removing 0 from the data identifier as 0 extension.

14. The cache data processing apparatus according to claim 12, further comprising:

a database KVS circuit connected to the 0 extender and the reverse 0 extender; and a second memory control circuit connected to the database KVS circuit, wherein the database KVS circuit is configured for performing data management on a database memory through the second memory control circuit.

15. The cache data processing apparatus according to claim 14, further comprising:

a database memory connected to the second memory control circuit; and a cache data linked list record memory connected to the first memory control circuit.

16. The cache data processing apparatus according to claim 15, further comprising:

a network transmission interface connected to the database KVS circuit.

17. A cache data processing device, comprising:

one or more memories, configured for storing computer-readable instructions; and one or more processors, configured for implementing steps of a cache data processing method, comprising:

obtaining access information of cache data;

determining, based on the access information and a cache file replacement policy, preceding target data and following target data of the cache data in a cache data linked list, wherein the cache data linked list is configured for recording data that matches the cache file replacement policy; and generating, based on the preceding target data and the following target data, a target key-value pair of the cache data, and storing the target key-value pair, to perform cache management on the cache data based on the target key-value pair; wherein the determining, based on the access information and a cache file replacement policy, preceding target data and following target data of the cache data in a cache data linked list comprises:

determining, based on the access information and the cache file replacement policy, target location information of the cache data in the cache data linked list; and determining, based on the target location information, the preceding target data and the following target data;

further comprising:

in response to an identifier of cache data to be queried not being present in the cache data linked list, determining whether a number of stored identifiers in the cache data linked list equals M, wherein M represents a maximum number of storable identifiers;

in response to the number of stored identifiers in the cache data linked list being equal to M, determining and deleting last target data in the cache data linked list according to storage content of a tail chain register, updating a target key-value pair of a new last target data after deleting, and updating content of the tail chain register;

in response to the number of stored identifiers in the cache data linked list not being equal to M, determining according to storage content of a head chain register and adding the identifier of the cache data to be queried before first data in the cache data linked list, updating a target key-value pair corresponding to an old first data and a target key-value pair corresponding to a new first data, and updating the storage content of the head chain register.

\* \* \* \* \*